US012709374B2

(12) United States Patent
Inoue

(10) Patent No.: US 12,709,374 B2
(45) Date of Patent: Aug. 18, 2026

(54) SYSTEM FOR AND METHOD OF SELECTING CONTROL MODES OF WATERCRAFT

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 226 days.

(21) Appl. No.: 18/210,138

(22) Filed: Jun. 15, 2023

(65) Prior Publication Data

US 2024/0002030 A1 Jan. 4, 2024

(30) Foreign Application Priority Data

Jun. 30, 2022 (JP) ................................ 2022-105861

(51) Int. Cl.
*B63H 25/42* (2006.01)
*B63H 25/04* (2006.01)
*G05D 1/00* (2024.01)

(52) U.S. Cl.
CPC ............ *B63H 25/42* (2013.01); *B63H 25/04* (2013.01); *G05D 1/0208* (2013.01)

(58) Field of Classification Search
CPC ....... B63H 25/42; B63H 25/04; G05D 1/0208
See application file for complete search history.

(56) References Cited

U.S. PATENT DOCUMENTS

2015/0089427 A1 3/2015 Akuzawa
2016/0229511 A1* 8/2016 Kishimoto ............ B63H 25/06
2019/0106190 A1* 4/2019 Schibli ................ B63H 20/007
2019/0308712 A1 10/2019 Akuzawa et al.
2022/0169353 A1* 6/2022 Ikegaya ................ B63H 25/46
2023/0140525 A1* 5/2023 Ikegaya ................ B63H 20/12 701/21
2023/0140720 A1* 5/2023 Ikegaya ................ B63H 20/12 440/1
2025/0065998 A1* 2/2025 Rivers ................ G01C 21/203

FOREIGN PATENT DOCUMENTS

JP 2015-066979 A 4/2015
JP 2023068837 A * 5/2023 ............ B63H 20/12
WO 2020/092643 A1 5/2020

OTHER PUBLICATIONS

Official Communication issued in corresponding European Patent Application No. 23172769.4, mailed on Dec. 11, 2023.

* cited by examiner

*Primary Examiner* — Scott A Browne
*Assistant Examiner* — Terry C Buse
(74) *Attorney, Agent, or Firm* — Keating & Bennett, LLP

(57) ABSTRACT

A system includes a marine propulsion device, an input, and a controller. The input outputs an operating signal indicating a first mode selected in accordance with an operation thereof, and the controller receives the operating signal. When it is intended to move the watercraft to a target spot from a first spot in the first mode, the controller is configured or programmed to select in which mode, including a bow mode that orients a bow of the watercraft toward the target spot, and a stern mode that orients a stern of the watercraft toward the target spot, the marine propulsion device is controlled depending on a position of the target spot with respect to the first spot so as to control the marine propulsion device such that the watercraft is moved from the first spot to the target spot in the bow mode or the stern mode.

16 Claims, 7 Drawing Sheets

SYSTEM FOR AND METHOD OF SELECTING CONTROL MODES OF WATERCRAFT

CROSS REFERENCE TO RELATED APPLICATIONS

This application claims the benefit of priority to Japanese Patent Application No. 2022-105861 filed on Jun. 30, 2022. The entire contents of this application are hereby incorporated herein by reference.

BACKGROUND OF THE INVENTION

1. Field of the Invention

The present invention relates to a system for and a method of controlling a watercraft.

2. Description of the Related Art

There has been conventionally known a type of system for automatically controlling a watercraft such that the watercraft moves toward a specified target spot. For example, a system described in Japan Laid-open Patent Application Publication No. 2015-66979 controls an outboard motor for a watercraft such that the watercraft moves toward a specified target spot in an autopilot mode. When the watercraft approaches the target spot, the system moors the watercraft in the target spot.

As a type of automated control for watercraft, there has been also conventionally known a keeping control for keeping a watercraft located in a target spot. When the watercraft is remote from the target spot under the conventional keeping control, an outboard motor is controlled to move the watercraft to the target spot in either a bow mode or a stern mode preliminarily set by a user. The bow mode serves to direct the bow of the watercraft to the target spot, whereas the stern mode serves to direct the stern of the watercraft to the target spot.

When the watercraft is remote from the target spot under the conventional keeping control, the outboard motor is controlled to move the watercraft to the target spot in either the bow mode or the stern mode preliminarily set by the user. Because of this, chances are that, when the watercraft is remote from the target spot, it takes time for the watercraft to move to the target spot depending on the position of the watercraft. Thus, there is still room for improvement for the conventional keeping control.

SUMMARY OF THE INVENTION

Preferred embodiments of the present invention provide systems and methods such that watercraft are easily maintained in a target spot under an automated control.

A system according to a preferred embodiment of the present invention relates to a system to control a watercraft and includes a marine propulsion device, an input, and a controller. The input is operable to output an operating signal indicating a first mode selected in accordance with an operation thereof. The controller is configured or programmed to receive the operating signal, and control the marine propulsion device such that the watercraft is maintained in a target spot in the first mode. When it is intended to move the watercraft to the target spot from a first spot remote from the target spot in the first mode, the controller is configured or programmed to select one of a bow mode orienting a bow of the watercraft toward the target spot or a stern mode orienting a stern of the watercraft toward the target spot, in which the marine propulsion device is controlled depending on a position of the target spot with respect to the first spot so as to control the marine propulsion device such that the watercraft is moved from the first spot to the target spot in the selected one of the bow mode or the stern mode.

A system according to another preferred embodiment of the present invention relates to a system to control a watercraft and includes a marine propulsion device, an input, and a controller. The input is operable to output an operating signal indicating a first mode selected in accordance with an operation thereof. The controller is configured or programmed to receive the operating signal, and control the marine propulsion device such that the watercraft is maintained in a target spot in the first mode. When it is intended to move the watercraft to the target spot from a first spot remote from the target spot in the first mode, the controller is configured or programmed to select one of a bow mode orienting a bow of the watercraft toward the target spot, a stern mode orienting a stern of the watercraft toward the target spot, or a compass direction keeping mode keeping constant a compass direction of the watercraft, maintained in which the marine propulsion device is controlled depending on a position of the target spot with respect to the first spot so as to control the marine propulsion device such that the watercraft is moved from the first spot to the target spot in the selected one of the bow mode, the stern mode, or the compass direction keeping mode.

A method according to yet another a preferred embodiment of the present invention relates to a method of controlling a watercraft including a marine propulsion device and an input and includes the following processes. The first process relates to receiving an operating signal indicating a first mode selected in accordance with an operation of the input. The second process relates to controlling the marine propulsion device such that the watercraft is maintained in a target spot in the first mode. The third process is executed when it is intended to move the watercraft to the target spot from a first spot remote from the target spot in the first mode and relates to selecting one of a bow mode orienting a bow of the watercraft toward the target spot or a stern mode orienting a stern of the watercraft toward the target spot, in which the marine propulsion device is controlled depending on a position of the target spot with respect to the first spot so as to control the marine propulsion device such that the watercraft is moved from the first spot to the target spot in the selected one of the bow mode or the stern mode.

A method according to still another preferred embodiment of the present invention relates to a method of controlling a watercraft including a marine propulsion device and an input and includes the following processes. The first process relates to receiving an operating signal indicating a first mode selected in accordance with an operation of the input. The second process relates to controlling the marine propulsion device such that the watercraft is maintained in a target spot in the first mode. The third process is executed when it is intended to move the watercraft to the target spot from a first spot remote from the target spot in the first mode and relates to selecting one of a bow mode orienting a bow of the watercraft toward the target spot, a stern mode orienting a stern of the watercraft toward the target spot, or a compass direction keeping mode keeping constant a compass direction of the watercraft, in which the marine propulsion device is controlled depending on a position of the target spot with respect to the first spot so as to control the marine propulsion device such that the watercraft is moved from the first spot to the target spot in the selected one of the bow mode, the stern mode, or the compass direction keeping mode.

In the systems and the methods according to the preferred embodiments of the present invention described above, when it is intended to move the watercraft from the first spot to the target spot in the first mode to control the marine propulsion device such that the watercraft is maintained in the target spot, the controller is configured or programmed to select one of the bow mode or the stern mode, or one of the bow mode, the stern mode, or the compass direction keeping mode, in which the marine propulsion device is controlled depending on the position of the target spot with respect to the first spot. Accordingly, the watercraft is efficiently moved to approach the target spot. Thus, the watercraft is easily maintained in the target spot.

Overall, according to the present disclosure and preferred embodiments of the present invention, it is possible to provide systems and methods that each enable watercrafts to be easily maintained in a target spot under automated control.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
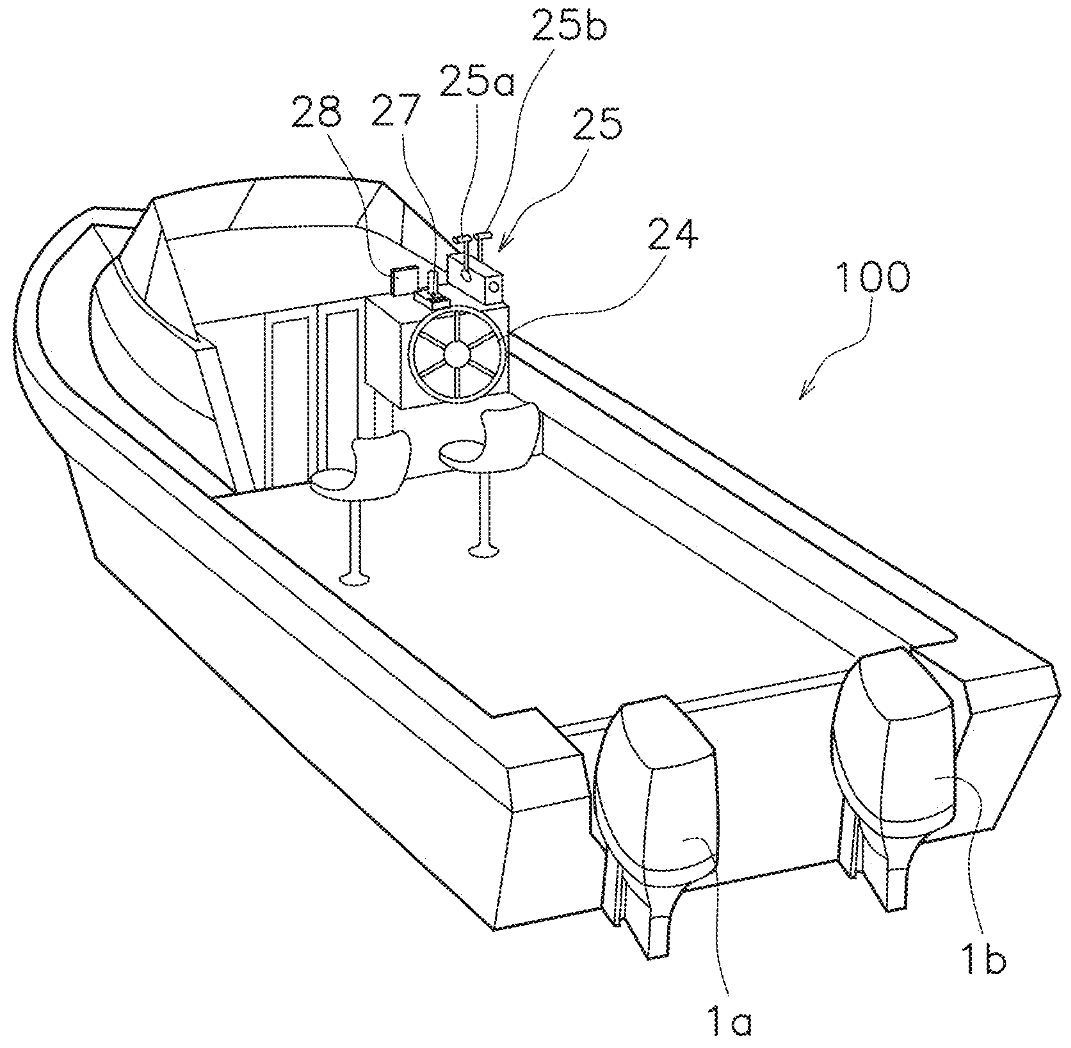
FIG. 1 is a perspective view of a watercraft to which marine propulsion devices according to a preferred embodiment of the present invention are mounted.

Preferred embodiments of the present invention will be hereinafter explained with reference to drawings. FIG. 1 is a perspective view of a watercraft 100 to which marine propulsion devices 1*a* and 1*b* are mounted. The marine propulsion devices 1*a* and 1*b* are mounted to the watercraft 100 as a plurality of marine propulsion devices. In the present preferred embodiment, the marine propulsion devices 1*a* and 1*b* are outboard motors. The marine propulsion devices 1*a* and 1*b* are attached to the stern of the watercraft 100. The marine propulsion devices 1*a* and 1*b* are disposed in alignment in the width direction of the watercraft 100. Each marine propulsion device 1*a*, 1*b* generates a thrust to propel the watercraft 100.

Figure 2:
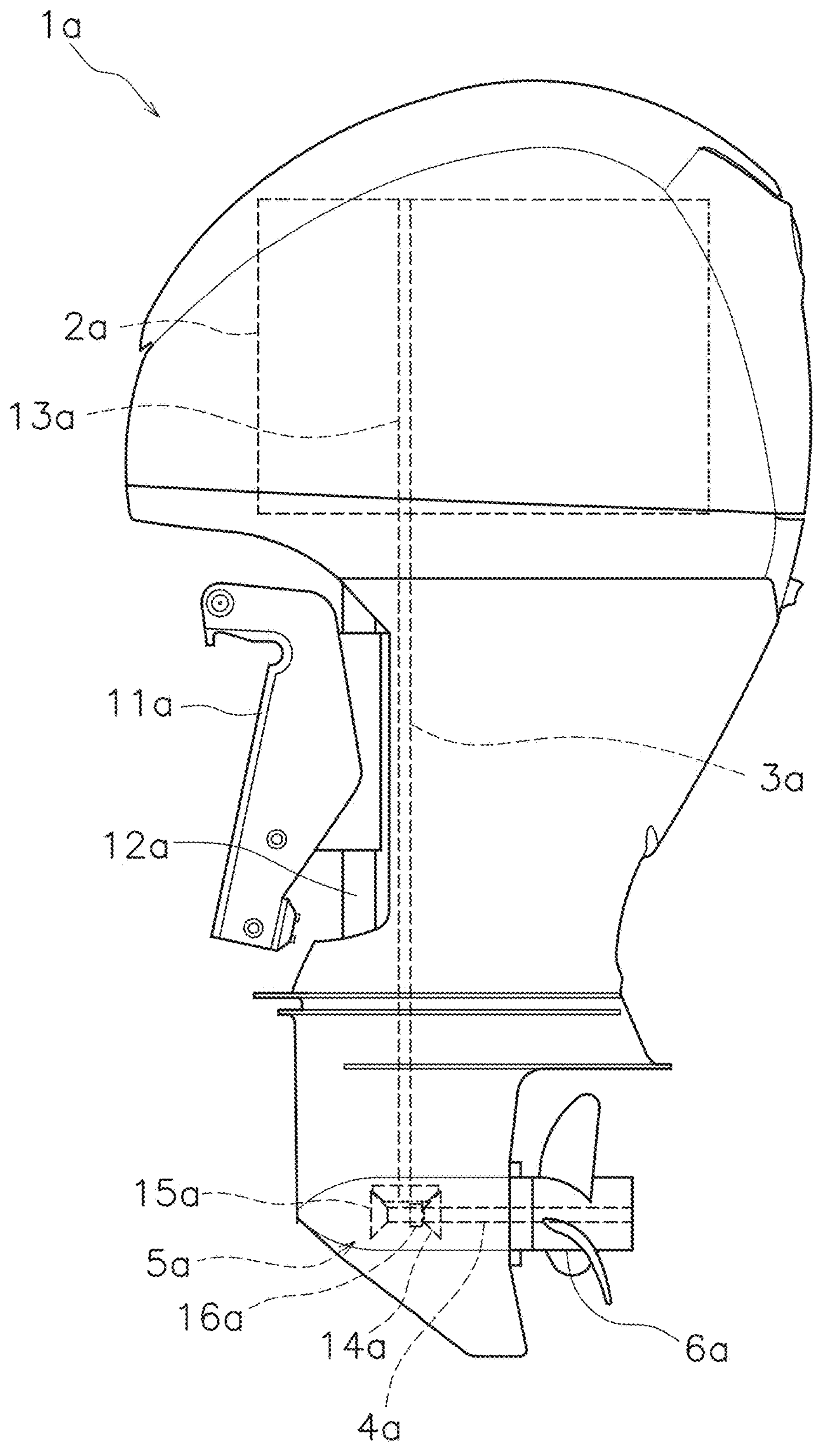
FIG. 2 is a side view of a marine propulsion device.

FIG. 2 is a side view of the marine propulsion device 1*a*. The structure of the marine propulsion device 1*a* will be hereinafter explained. However, the structure of the marine propulsion device 1*a* is also true of the marine propulsion device 1*b*. The marine propulsion device 1*a* is attached to the watercraft 100 through a bracket 11*a*. The bracket 11*a* supports the marine propulsion device 1*a* such that the marine propulsion device 1*a* is rotatable about a steering shaft 12*a*.

The marine propulsion device 1*a* includes a drive unit 2*a*, a drive shaft 3*a*, a propeller shaft 4*a*, and a shift mechanism 5*a*. The drive unit 2*a* includes, for example, an internal combustion engine. The drive unit 2*a* includes a crankshaft 13*a*. The crankshaft 13*a* extends in the up-and-down direction of the marine propulsion device 1*a*. The drive shaft 3*a* is connected to the crankshaft 13*a*. The propeller shaft 4*a* extends in the back-and-forth direction of the marine propulsion device 1*a*. The propeller shaft 4*a* is connected to the drive shaft 3*a* through the shift mechanism 5*a*. A propeller 6*a* is attached to the propeller shaft 4*a*.

The shift mechanism 5*a* includes a forward moving gear 14*a*, a rearward moving gear 15*a*, and a dog clutch 16*a*. When gear engagement of each gear 14*a*, 15*a* is switched by the dog clutch 16*a*, the shift mechanism 5*a* is switched among a forward moving state, a rearward moving state, and a neutral state.

Figure 3:
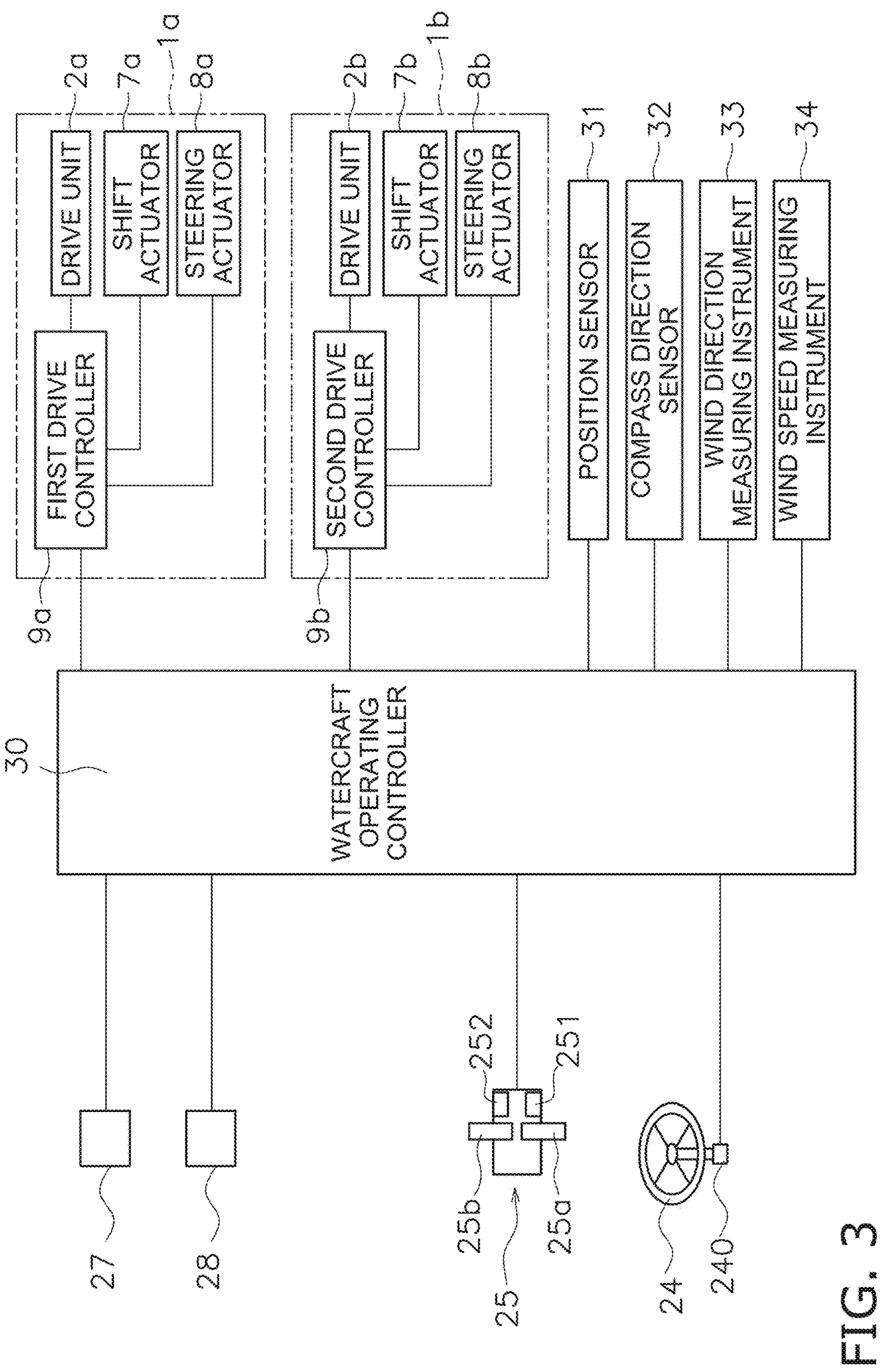
FIG. 3 is a schematic diagram showing a configuration of a watercraft operating system.

FIG. 3 is a schematic diagram showing a configuration of a watercraft operating system for the watercraft 100. As shown in FIG. 3, the marine propulsion device 1*a* includes a shift actuator 7*a* and a steering actuator 8*a*.

The shift actuator 7*a* is connected to the dog clutch 16*a* of the shift mechanism 5*a*. The shift actuator 7*a* actuates the dog clutch 16*a* to switch gear engagement of each gear 14*a*, 15*a*. In response, the shift mechanism 5*a* is switched among the forward moving state, the rearward moving state, and the neutral state. The shift actuator 7*a* includes, for instance, an electric motor. However, the shift actuator 7*a* may be another type of actuator such as an electric cylinder, a hydraulic motor, or a hydraulic cylinder.

The steering actuator 8*a* is connected to the marine propulsion device 1*a*. The steering actuator 8*a* rotates the marine propulsion device 1*a* about the steering shaft 12*a*. Accordingly, the marine propulsion device 1*a* is changed in rudder angle. The rudder angle refers to an angle of the propeller shaft 4*a* with respect to the back-and-forth direction of the marine propulsion device 1*a*. The steering actuator 8*a* includes, for instance, an electric motor. However, the steering actuator 8*a* may be another type of actuator such as an electric cylinder, a hydraulic motor, or a hydraulic cylinder.

The marine propulsion device 1*a* includes a first drive controller 9*a*. The first drive controller 9*a* includes a processor such as a CPU (Central Processing Unit) and memories such as a RAM (Random Access Memory) and a ROM (Read Only Memory). The first drive controller 9*a* stores programs and data to control the marine propulsion device 1*a*. The first drive controller 9*a* controls the drive unit 2*a*.

The marine propulsion device 1*b* includes a drive unit 2*b*, a shift actuator 7*b*, a steering actuator 8*b*, and a second drive controller 9*b*. The drive unit 2*b*, the shift actuator 7*b*, the steering actuator 8*b*, and the second drive controller 9*b* in the marine propulsion device 1*b* are configured in similar manner to the drive unit 2*a*, the shift actuator 7*a*, the steering actuator 8*a*, and the first drive controller 9*a* in the marine propulsion device 1*a*, respectively.

The watercraft operating system includes a steering wheel 24, an operating device 25, a first input device 27, and a second input device 28. The steering wheel 24, the operating device 25, the first input device 27, and the second input device 28 are disposed in a cockpit of the watercraft 100.

The steering wheel 24, the operating device 25, the first input device 27, and the second input device 28 are manually operable.

The steering wheel 24 allows an operator to operate the turning direction of the watercraft 100. The steering wheel 24 includes a sensor 240. The sensor 240 outputs a steering signal indicating the operating direction and the operating amount of the steering wheel 24.

The operating device 25 includes a first throttle lever 25*a* and a second throttle lever 25*b*. The first throttle lever 25*a* allows the operator to regulate the magnitude of the thrust generated by the marine propulsion device 1*a*. The first throttle lever 25*a* allows the operator to switch the direction of the thrust generated by the marine propulsion device 1*a* between a forward moving direction and a rearward moving direction. The first throttle lever 25*a* is operable from a neutral position to a forward moving position and a rearward moving position. The neutral position is a position located between the forward moving position and the rearward moving position. The first throttle lever 25*a* includes a sensor 251. The sensor 251 outputs a throttle signal indicating the operating direction and the operating amount of the first throttle lever 25*a*.

The second throttle lever 25*b* allows the operator to regulate the magnitude of the thrust generated by the marine propulsion device 1*b*. The second throttle lever 25*b* allows the operator to switch the direction of the thrust generated by the marine propulsion device 1*b* between the forward moving direction and the rearward moving direction. The second throttle lever 25*b* is configured in similar manner to the first throttle lever 25*a*. The second throttle lever 25*b* includes a sensor 252. The sensor 252 outputs a throttle signal indicating the operating direction and the operating amount of the second throttle lever 25*b*.

The watercraft operating system includes a watercraft operating controller 30. The watercraft operating controller 30 includes a processor such as a CPU and memories such as a RAM and a ROM. The watercraft operating controller 30 stores programs and data to control the marine propulsion devices 1*a* and 1*b*. The watercraft operating controller 30 is connected to the first and second drive controllers 9*a* and 9*b* through wired or wireless communication. The watercraft operating controller 30 is connected to the steering wheel 24, the operating device 25, the first input device 27, and the second input device 28 through wired or wireless communication.

The watercraft operating controller 30 receives the steering signal from the sensor 240. The watercraft operating controller 30 receives the throttle signal from each sensor 251, 252. The watercraft operating controller 30 outputs command signals to the first and second drive controllers 9*a* and 9*b* based on the signals received from the sensors 240, 251, and 252. The command signal is transmitted to the shift actuator 7*a* and the steering actuator 8*a* through the first drive controller 9*a*. The command signal is transmitted to the shift actuator 7*b* and the steering actuator 8*b* through the second drive controller 9*b*.

For example, the watercraft operating controller 30 outputs a command signal for the shift actuator 7*a* depending on the operating direction of the first throttle lever 25*a*. In response, shifting between forward movement and rearward movement is performed by the marine propulsion device 1*a*. The watercraft operating controller 30 outputs a throttle command for the drive unit 2*a* depending on the operating amount of the first throttle lever 25*a*. The first drive controller 9*a* controls the output rotational speed of the marine propulsion device 1*a* in accordance with the throttle command.

The watercraft operating controller 30 outputs a command signal for the shift actuator 7*b* depending on the operating direction of the second throttle lever 25*b*. In response, shifting between forward movement and rearward movement is performed by the marine propulsion device 1*b*. The watercraft operating controller 30 outputs a throttle command for the drive unit 2*b* depending on the operating amount of the second throttle lever 25*b*. The second drive controller 9*b* controls the output rotational speed of the marine propulsion device 1*b* in accordance with the throttle command.

The watercraft operating controller 30 controls each steering actuator 8*a*, 8*b* such that each marine propulsion device 1*a*, 1*b* is rotated about the steering shaft 12*a* thereof depending on the operating direction and the operating amount of the steering wheel 24. The watercraft operating controller 30 controls the rudder angle of each marine propulsion device 1*a*, 1*b* depending on the operating amount of the steering wheel 24.

The watercraft operating system includes a position sensor 31. The position sensor 31 detects the position of the watercraft 100. The position sensor 31 is a GNSS (Global Navigation Satellite System) receiver such as a GPS (Global Positioning System) receiver. However, the position sensor 31 may be a type of sensor other than the GNSS receiver. The position sensor 31 outputs a signal indicating the position of the watercraft 100. The watercraft operating controller 30 is connected to the position sensor 31 in a communicable manner. The watercraft operating controller 30 obtains the position of the watercraft 100 based on the signal outputted thereto from the position sensor 31. The watercraft operating controller 30 obtains the speed of the watercraft 100 based on the signal outputted thereto from the position sensor 31. The watercraft operating system may include another type of sensor to detect the speed over ground (ground speed) or the speed on the water (water speed) of the watercraft 100. The speed over ground refers to the speed of the watercraft 100 with respect to the ground, whereas the speed on the water refers to the speed of the watercraft 100 with respect to water (seawater).

The watercraft operating system includes a compass direction sensor 32. The compass direction sensor 32 detects the course of the watercraft 100. The compass direction sensor 32 includes, for instance, an IMU (Inertial Measurement Unit). However, the compass direction sensor 32 may be a type of sensor other than the IMU. The watercraft operating controller 30 is connected to the compass direction sensor 32 in a communicable manner. The watercraft operating controller 30 obtains the course of the watercraft 100 based on a signal outputted thereto from the compass direction sensor 32.

The watercraft operating system includes a wind direction measuring instrument 33 and a wind speed measuring instrument 34. The wind direction measuring instrument 33 and the wind speed measuring instrument 34 output measurement results thereof to the watercraft operating controller 30. The watercraft operating controller 30 obtains a wind direction and a wind speed based on signals outputted thereto from the wind direction measuring instrument 33 and the wind speed measuring instrument 34. In the present preferred embodiment, the wind direction measuring instrument 33 and the wind speed measuring instrument 34 may be omitted.

The first input device 27 is disposed on, for instance, a watercraft operating device such as a joystick. The first input device 27 is operable by the operator to select one of control modes of each marine propulsion device 1*a*, 1*b*. The first input device 27 includes at least one switch to select one of the control modes. The first input device 27 may not necessarily include the at least one switch, and alternatively, may include another type of device such as a touchscreen. The first input device 27 outputs an operating signal indicating the control mode selected in accordance with the operation by the operator.

The watercraft operating controller 30 receives the operating signal from the first input device 27. The watercraft operating controller 30 executes automated watercraft control for the watercraft 100 by controlling the rudder angle and the thrust of each marine propulsion device 1*a*, 1*b* in accordance with the selected control mode.

The second input device 28 is operable by the operator to perform a control mode setting. The second input device 28 includes, for instance, a touchscreen. The second input device 28 is not limited to the touchscreen, and alternatively, may include another type of device such as at least one switch. The second input device 28 outputs an operating signal indicating the setting of the control mode selected by the operator. The watercraft operating controller 30 receives the operating signal from the second input device 28.

The control modes include a first mode and a second mode. In the first mode, the watercraft operating controller 30 controls each marine propulsion device 1*a*, 1*b* such that the watercraft 100 is maintained in a target spot. The target spot is, for instance, the position of the watercraft 100 located when the first mode was selected by the first input device 27. In other words, the watercraft operating controller 30 controls each marine propulsion device 1*a*, 1*b* such that the watercraft 100 is maintained in the position thereof located at a point in time when the operating signal, indicating the first mode, was received by the watercraft operating controller 30.

In the second mode, the watercraft operating controller 30 controls each marine propulsion device 1*a*, 1*b* such that the watercraft 100 is maintained in the target spot, while the bow of the watercraft 100 is kept oriented in a target compass direction. In the second mode, the target spot and the target compass direction are, for instance, the position and the compass direction of the watercraft 100 located and oriented when the second mode was selected by the first input device 27. In other words, the watercraft operating controller 30 controls each marine propulsion device 1*a*, 1*b* such that the watercraft 100 is maintained in the target spot (P0), while being kept oriented in the compass direction thereof oriented at a point in time when the operating signal, indicating the second mode, was received by the watercraft operating controller 30. The second mode is a mode including transverse movement of the watercraft 100 in a low-speed range. It should be noted that the target compass direction may be arbitrarily set by the operator using the second input device 28.

Figure 4:
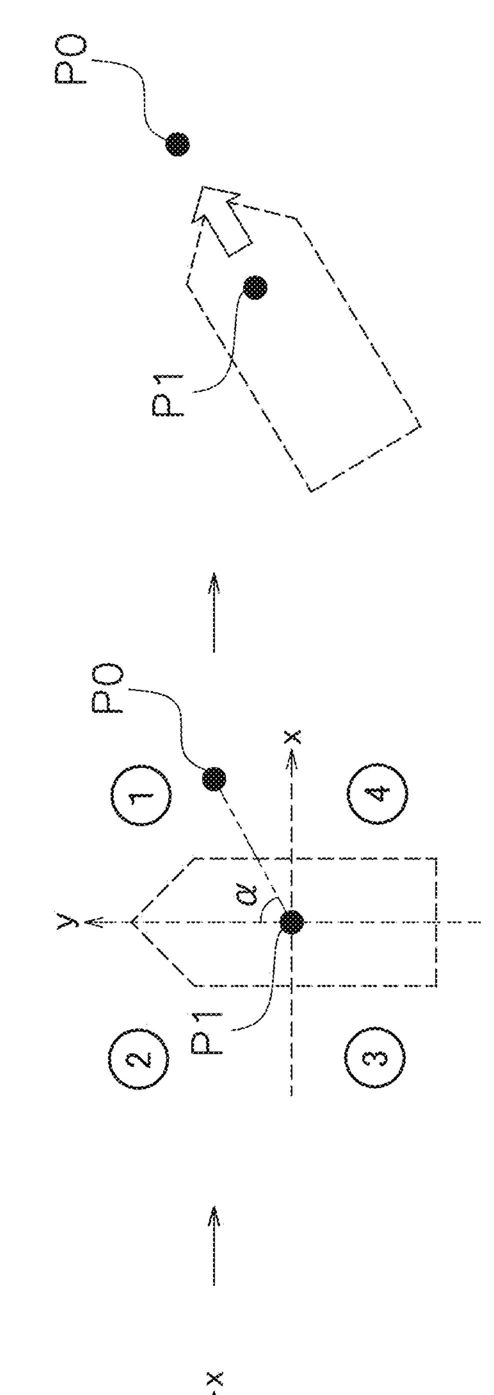
FIG. 4 is a diagram showing a series of motions performed by the watercraft when a bow mode is selected in a first control mode.
Figure 4:
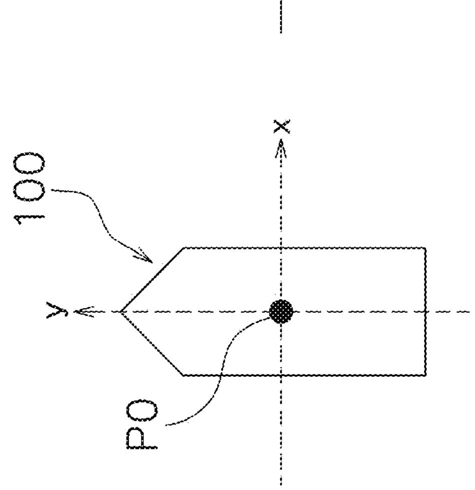
Figure 4:
Figure 5:
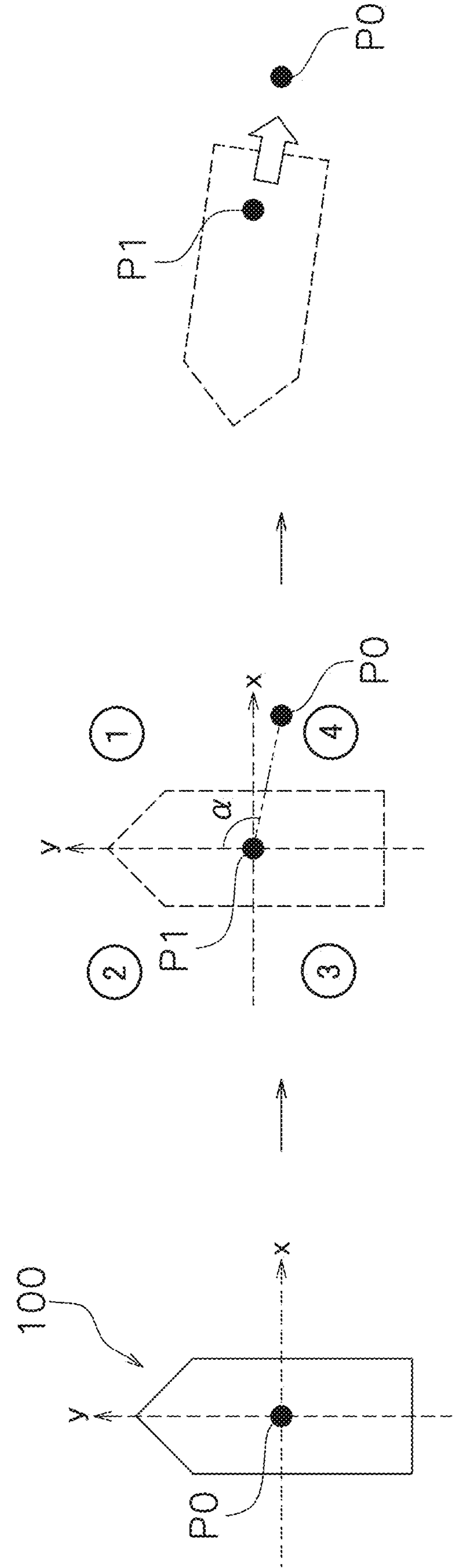
FIG. 5 is a diagram showing a series of motions performed by the watercraft when a stern mode is selected in the first control mode.

As shown in FIGS. 4 and 5, when it is intended to move the watercraft 100 to the target spot P0 from a first spot P1 (the present position of the watercraft 100) remote from, or spaced away from, the target spot P0 in the first mode, the watercraft operating controller 30 selects one a bow mode or a stern mode in which each marine propulsion device 1*a*, 1*b* is controlled depending on the position of the target spot P0 with respect to the first spot P1 and controls each marine propulsion device 1*a*, 1*b* in the selected mode such that the watercraft 100 is moved from the first spot P1 to the target spot P0.

FIG. 4 is a diagram showing a series of motions performed by the watercraft 100 when the bow mode is selected. The bow mode is a mode in which the watercraft 100 is moved to the target spot P0 with the bow of the watercraft 100 facing the target spot P0. For example, a Cartesian coordinate system with x- and y-axes is herein assumed. The center of gravity of the watercraft 100 is set as the origin of the Cartesian coordinate system; the x- and y-axes divide the coordinate plane into four quadrants defined as first to fourth quadrants. When the target spot P0 is located in the first or second quadrant, the watercraft operating controller 30 selects the bow mode. In FIG. 4, the target spot P0 is located in the first quadrant. The y-axis is an axis that passes through the center of gravity of the watercraft 100, the middle of the bow of the watercraft 100, and the middle of the stern of the watercraft 100. The x-axis is an axis that passes through the center of gravity of the watercraft 100 and is perpendicular to the y-axis.

As shown in FIG. 5, the stern mode is a mode in which the watercraft 100 is moved from the stern of the watercraft 100 to the target spot P0 with the stern of the watercraft 100 facing the target spot P0. When the target spot P0 is located in the third or fourth quadrant, the watercraft operating controller 30 selects the stern mode. In FIG. 5, the target spot P0 is located in the fourth quadrant.

A determination regarding in which of the first to fourth quadrants the target spot P0 is located is made based on, for instance, a difference in an angle $\alpha$ between the compass direction from the first spot P1 to the target spot P0 and the compass direction of the bow of the watercraft 100 located in the first spot P1. As shown in FIG. 4, when the difference in angle $\alpha$ is an acute angle, the first spot P1 is supposed to be located in the first or second quadrant. Thus, the watercraft operating controller 30 selects the bow mode. As shown in FIG. 5, when the difference in angle $\alpha$ is an obtuse angle, the first spot P1 is supposed to be located in the third or fourth quadrant. Thus, the watercraft operating controller 30 selects the stern mode.

In the first mode, the watercraft operating controller 30 determines whether or not the watercraft 100 is remote from the target spot P0 by a predetermined distance or more. In other words, the watercraft operating controller 30 determines whether or not the distance to the target spot P0 from the present position of the watercraft 100 is a predetermined threshold or more. When the distance to the target spot P0 from the present position of the watercraft 100 is the predetermined threshold or more, the watercraft operating controller 30 selects one of the bow mode or the stern mode in which each marine propulsion device 1*a*, 1*b* is controlled and controls each marine propulsion device 1*a*, 1*b* in the selected mode such that the watercraft 100 is moved from the present position to the target spot P0.

When controlling each marine propulsion device 1*a*, 1*b* such that the bow of the watercraft 100 is oriented toward the target spot P0 by selecting the bow mode in the first mode, the watercraft operating controller 30 determines whether or not the turning speed of the watercraft 100 is a predetermined speed or less. When the turning speed of the watercraft 100 is the predetermined speed or less, the watercraft operating controller 30 switches the bow mode to the stern mode and controls each marine propulsion device 1*a*, 1*b* in the stern mode.

When controlling each marine propulsion device 1*a*, 1*b* such that the stern of the watercraft 100 is oriented toward the target spot P0 by selecting the stern mode in the first mode, the watercraft operating controller 30 determines whether or not the turning speed of the watercraft 100 is the predetermined speed or less. When the turning speed of the watercraft 100 is the predetermined speed or less, the watercraft operating controller 30 switches the stern mode to the bow mode and controls each marine propulsion device 1*a*, 1*b* in the bow mode.

Figure 6:
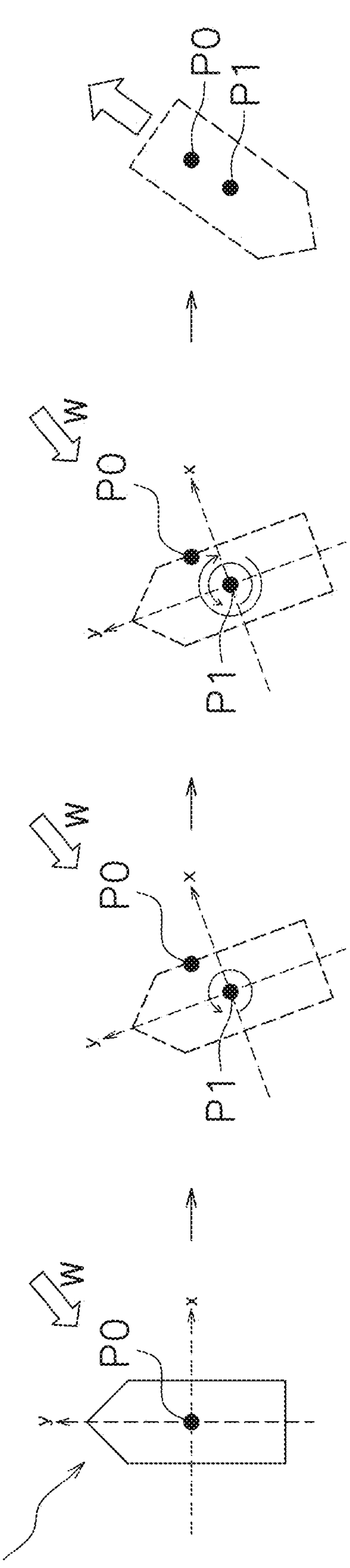
FIG. 6 is a diagram showing a series of motions performed by the watercraft in the first control mode.

Specifically, as shown in FIG. 6, chances are that the watercraft 100 is swept, while spinning, from the target spot P0 by the effect of wind or tide. In the example shown in FIG. 6, the watercraft 100 receives wind W blowing from the northeast. In other words, the watercraft 100 is more likely to be affected and moved by the wind W at the bow than at the stern. Thus, the watercraft 100 is swept, while spinning counterclockwise. In this case, the target spot P0 is located in the first quadrant. Thus, the watercraft operating controller 30 selects the bow mode and controls each marine propulsion device 1*a*, 1*b* such that the watercraft 100 turns clockwise. However, the wind W blowing from the northeast acts on the watercraft 100 so as to spin the watercraft 100 counterclockwise. Thus, chances are that the turning speed becomes slow and the bow of the watercraft 100 cannot be oriented to the target spot P0 even after an elapse of a predetermined period of time. Because of this, when the turning speed of the watercraft 100 is the predetermined speed or less, the watercraft operating controller 30 switches the bow mode to the stern mode and controls each marine propulsion device 1*a*, 1*b* in the stern mode.

Figure 7:
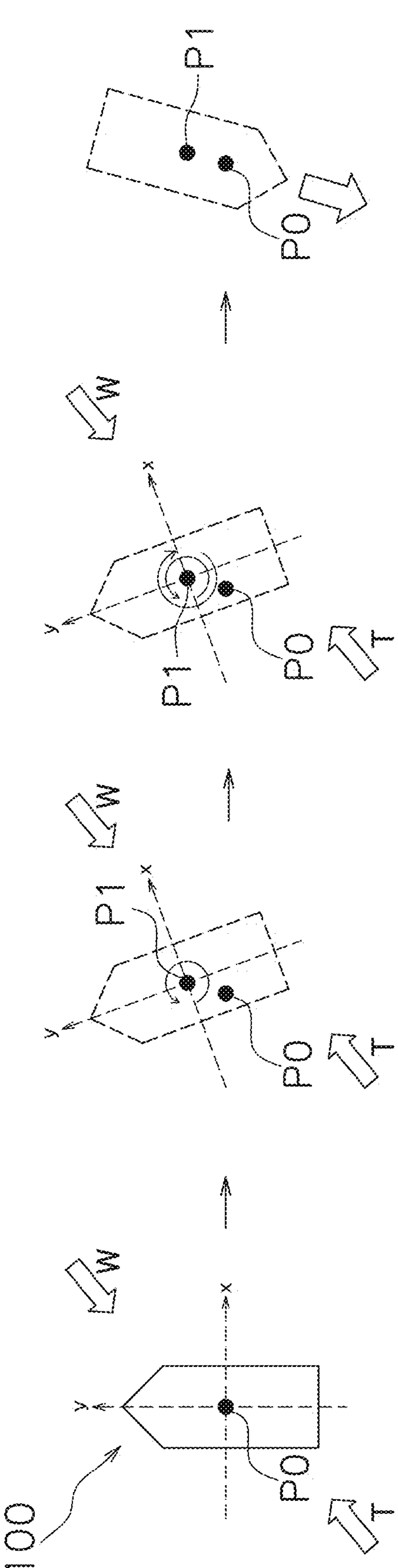
FIG. 7 is a diagram showing a series of motions performed by the watercraft in the first control mode.
Figure 7:

As shown in FIG. 7, chances are that the watercraft 100 is swept from the target spot P0, while spinning counterclockwise, by receiving the wind W blowing from the northeast and tide T flowing from the southwest. In the example shown in FIG. 7, the target spot P0 is located in the third quadrant. Thus, the watercraft operating controller 30 selects the stern mode and controls each marine propulsion device 1*a*, 1*b* such that the watercraft 100 turns clockwise. However, the wind W blowing from the northeast acts on the watercraft 100 so as to spin the watercraft 100 counterclockwise. Thus, chances are that the turning speed gets slow and the stern of the watercraft 100 cannot be oriented to the target spot P0 even after an elapse of the predetermined period of time. Because of this, when the turning speed of the watercraft 100 is the predetermined speed or less, the watercraft operating controller 30 switches the stern mode to the bow mode and controls each marine propulsion device 1*a*, 1*b* in the bow mode.

In the first mode, the watercraft operating controller 30 determines whether or not the speed on the water of the watercraft 100 is a predetermined speed or less. When the speed on the water of the watercraft 100 is the predetermined speed or less in the first mode, the watercraft operating controller 30 switches the first mode to the second mode and controls each marine propulsion device 1*a*, 1*b* in the second mode. When switching the first mode to the second mode depending on the speed on the water of the watercraft 100, the watercraft operating controller 30 controls each marine propulsion device 1*a*, 1*b*, for instance, such that the watercraft 100 is maintained in the target spot P0, while being kept oriented in the compass direction thereof oriented when the first mode has been switched to the second mode. The predetermined speed is, for instance, a speed that is enough to keep the position and the compass direction of the watercraft 100 by idling each marine propulsion device 1*a*, 1*b* in the second mode.

It should be noted that when switching the first mode to the second mode depending on the speed on the water of the watercraft 100, the watercraft operating controller 30 may control each marine propulsion device 1*a*, 1*b* such that the watercraft 100 is maintained in the target spot P0, while being kept oriented in the compass direction thereof oriented when the first mode was selected by the first input device 27. When switching the first mode to the second mode, the watercraft operating controller 30 may inform an operator of this switching through a touchscreen or an informing device.

After switching the first mode to the second mode, the watercraft operating controller 30 determines whether or not the watercraft 100 is remote from the target spot P0 by a predetermined distance or more. In other words, after switching the first mode to the second mode, the watercraft operating controller 30 determines whether or not the distance to the target spot P0 from the present position of the watercraft 100 is a predetermined threshold or more. When the distance to the target spot P0 from the present position of the watercraft 100 is the predetermined threshold or more, it is difficult to keep the position and the compass direction of the watercraft 100 in the second mode. Thus, the watercraft operating controller 30 switches the second mode to the first mode and controls each marine propulsion device 1*a*, 1*b* in the first mode. When switching the second mode to the first mode, the watercraft operating controller 30 may inform the operator of this switching through the touchscreen or the informing device.

In the watercraft operating system according to the preferred embodiments explained above, when it is intended to move the watercraft 100 from the first spot P1 to the target spot P0 in the first mode to control each marine propulsion device 1*a*, 1*b* such that the watercraft 100 is maintained in the target spot P0, the watercraft operating controller 30 selects one of the bow mode or the stern mode in which each marine propulsion device 1*a*, 1*b* should be controlled depending on the position of the target spot P0 with respect to the first spot P1. Accordingly, the watercraft 100 is efficiently moved to approach the target spot P0. Thus, the watercraft 100 is easily maintained in the target spot P0.

The first mode is switched to the second mode depending on the speed on the water of the watercraft 100, whereas the second mode is switched to the first mode depending on the distance to the target spot P0 from the present position of the watercraft 100. Thus, among the control modes, a suitable mode for the condition of the watercraft 100 is automatically selected.

Preferred embodiments of the present invention have been explained above. However, the present invention is not limited to the preferred embodiments described above, and a variety of changes can be made without departing from the gist of the present invention.

Each marine propulsion device is not limited to the outboard motor, and alternatively, may be another type of propulsion device such as an inboard engine outboard drive or a jet propulsion device. The structure of each marine propulsion device is not limited to that in the preferred embodiments described above and may be changed. For example, each drive unit 2*a*, 2*b* is not limited to the internal combustion engine, and alternatively, may be an electric motor. Yet alternatively, each drive unit 2*a*, 2*b* may be a hybrid system of an internal combustion engine and an electric motor. The number of marine propulsion devices is not limited to two. The number of marine propulsion devices may be more than two.

The watercraft operating controller 30 is configured to select either the bow mode or the stern mode in the first mode based on a difference in the angle $\alpha$ between the direction from the first spot P1 to the target spot P0 and the compass direction of the bow of the watercraft 100 located in the first spot P1. However, the watercraft operating controller 30 may select either the bow mode or the stern mode depending on the wind direction and the wind speed. Alternatively, the watercraft operating controller 30 may select either the bow mode or the stern mode depending on the difference in the angle $\alpha$ and both the wind direction and the wind speed. Yet alternatively, with respect to both the bow mode and the stern mode, a length of time required to achieve orientation toward the target spot P0 may be calculated depending on at least either the difference in the angle $\alpha$ or both the wind direction and the wind speed. Then, the watercraft operating controller 30 may be configured to select the mode that is shorter in length of time required to achieve orientation toward the target spot P0.

The first mode may further include a compass direction keeping mode to keep the compass direction of the watercraft 100. The compass direction keeping mode is identical to the control mode to be executed in the second mode. Specifically, when it is intended to move the watercraft 100 from the first spot P1 to the target spot P0 in the first mode, a selection may be made regarding in which of the bow mode, the stern mode, or the compass direction keeping mode each marine propulsion device 1*a*, 1*b* is controlled depending on the position of the target spot P0 with respect to the first spot P1. For example, the watercraft operating controller 30 may select the compass direction keeping mode when the distance to the target spot P0 from the present position of the watercraft 100 is less than a predetermined threshold.

In a preferred embodiment of the present invention, the watercraft operating controller 30 is configured to switch the first mode to the second mode depending on the speed on the water of the watercraft 100. However, the watercraft operating controller 30 may switch the first mode to the second mode when the number of revolutions of the drive unit 2*a*, cumulated from the onset of controlling the watercraft 100 in the first mode, is a predetermined value or less and simultaneously the speed of the watercraft 100 approaching the target spot P0 is greater than a predetermined speed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:

a marine propulsion device;

an input to output an operating signal indicating a first mode selected in accordance with an operation thereof; and a controller configured or programmed to receive the operating signal, and control the marine propulsion device such that the watercraft is maintained in a target spot in the first mode; wherein when it is intended to move the watercraft to the target spot from a first spot remote from the target spot in the first mode, the controller is configured or programmed to select one of a bow mode or a stern mode in which the marine propulsion device is controlled depending on a position of the target spot with respect to the first spot so as to control the marine propulsion device such that the watercraft is moved from the first spot to the target spot in the selected one of the bow mode or the stern mode;

the bow mode orients a bow of the watercraft so that the bow faces toward the target spot, and the stern mode orients a stern of the watercraft so that the stern faces toward the target spot; and when it is intended to move the watercraft from the first spot to the target spot in the first mode, the controller is configured or programmed to calculate a length of time required to achieve an orientation toward the target spot with respect to both the bow mode and the stern mode so as to select the bow mode or the stern mode having a shorter length of time required to achieve the orientation toward the target spot.

2. The system according to claim 1, wherein the controller is configured or programmed to select the bow mode or the stern mode depending on at least either a wind direction or a difference in an angle between a compass direction from the first spot to the target spot and a compass direction of the watercraft located in the first spot.

3. The system according to claim 1, wherein the controller is configured or programmed to determine whether or not a water speed of the watercraft is a predetermined speed or less in the first mode;

when the water speed of the watercraft is the predetermined speed or less in the first mode, the controller is configured or programmed to switch the first mode into a second mode so as to control the marine propulsion device in the second mode; and the controller is configured or programmed to control the marine propulsion device in the second mode such that the watercraft is maintained in the target spot and with a compass direction thereof kept constant.

4. The system according to claim 3, wherein the controller is configured or programmed to determine whether or not the watercraft is remote from the target spot by a predetermined distance or more after switching the first mode to the second mode; and when the watercraft is remote from the target spot by the predetermined distance or more, the controller is configured or programmed to switch the second mode to the first mode so as to control the marine propulsion device in the first mode.

5. The system according to claim 1, wherein the controller is configured or programmed to control the marine propulsion device in the first mode such that the watercraft is maintained in a position thereof located at a point in time when the operating signal indicating the first mode was received by the controller.

6. The system according to claim 1, wherein the controller is configured or programmed to determine whether or not the watercraft is remote from the target spot by a predetermined distance or more in the first mode; and when the watercraft is remote from the target spot by the predetermined distance or more in the first mode, the controller is configured or programmed to select one of the bow mode or the stern mode in which the marine propulsion device is controlled so as to control the marine propulsion device such that the watercraft is moved from the first spot to the target spot in the selected one of the bow mode or the stern mode.

7. A system for controlling a watercraft, the system comprising:

a marine propulsion device;

an input to output an operating signal indicating a first mode selected in accordance with an operation thereof; and a controller configured or programmed to receive the operating signal, and control the marine propulsion device such that the watercraft is maintained in a target spot in the first mode; wherein when it is intended to move the watercraft to the target spot from a first spot remote from the target spot in the first mode, the controller is configured or programmed to select one of a bow mode or a stern mode in which the marine propulsion device is controlled depending on a position of the target spot with respect to the first spot so as to control the marine propulsion device such that the watercraft is moved from the first spot to the target spot in the selected one of the bow mode or the stern mode;

the bow mode orients a bow of the watercraft so that the bow faces toward the target spot, and the stern mode orients a stern of the watercraft so that the stern faces toward the target spot;

the controller is configured or programmed to determine whether or not a turning speed of the watercraft is a predetermined speed or less when controlling the marine propulsion device such that the bow of the watercraft is oriented toward the target spot by selecting the bow mode in the first mode; and when the turning speed of the watercraft is the predetermined speed or less in the bow mode, the controller is configured or programmed to switch the bow mode to the stern mode so as to control the marine propulsion device in the stern mode.

8. A system for controlling a watercraft, the system comprising:

a marine propulsion device;

an input to output an operating signal indicating a first mode selected in accordance with an operation thereof; and a controller configured or programmed to receive the operating signal, and control the marine propulsion device such that the watercraft is maintained in a target spot in the first mode; wherein when it is intended to move the watercraft to the target spot from a first spot remote from the target spot in the first mode, the controller is configured or programmed to select one of a bow mode or a stern mode in which the marine propulsion device is controlled depending on a position of the target spot with respect to the first spot so as to control the marine propulsion device such that the watercraft is moved from the first spot to the target spot in the selected one of the bow mode or the stern mode;

the bow mode orients a bow of the watercraft so that the bow faces toward the target spot, and the stern mode orients a stern of the watercraft so that the stern faces toward the target spot;

the controller is configured or programmed to determine whether or not a turning speed of the watercraft is a predetermined speed or less when controlling the marine propulsion device such that the stern of the watercraft is oriented toward the target spot by selecting the stern mode in the first mode; and when the turning speed of the watercraft is the predetermined speed or less in the stern mode, the controller is configured or programmed to switch the stern mode to the bow mode so as to control the marine propulsion device in the bow mode.

9. A method of controlling a watercraft including a marine propulsion device and an input, the method comprising:

receiving an operating signal indicating a first mode selected in accordance with an operation of the input;

controlling the marine propulsion device such that the watercraft is maintained in a target spot in the first mode; and when it is intended to move the watercraft to the target spot from a first spot remote from the target spot in the first mode, selecting one of a bow mode or a stern mode in which the marine propulsion device is controlled depending on a position of the target spot with respect to the first spot so as to control the marine propulsion device such that the watercraft is moved from the first spot to the target spot in the bow mode or the stern mode; wherein the bow mode orients a bow of the watercraft so that the bow faces toward the target spot, and the stern mode orients a stern of the watercraft so that the stern faces toward the target spot; and the method further comprises, when it is intended to move the watercraft to the target spot from the first spot remote from the target spot in the first mode, calculating a length of time required to achieve orientation toward the target spot with respect to both the bow mode and the stern mode so as to select one of the bow mode or the stern mode having a shorter length of time required to achieve orientation toward the target spot than the other of the bow mode or the stern mode.

10. The method according to claim 9, further comprising:

selecting one of the bow mode or the stern mode in which the marine propulsion device is controlled in the first mode depending on at least either a wind direction or a difference in an angle between a compass direction from the first spot to the target spot and a compass direction of the watercraft located in the first spot.

11. The method according to claim 9, further comprising:

determining whether or not a water speed of the watercraft is a predetermined speed or less in the first mode;

when the water speed of the watercraft is the predetermined speed or less in the first mode, switching the first mode into a second mode so as to control the marine propulsion device in the second mode; and controlling the marine propulsion device in the second mode such that the watercraft is maintained in the target spot and with a compass direction thereof kept constant.

12. The method according to claim 11, further comprising:

determining whether or not the watercraft is remote from the target spot by a predetermined distance or more after switching the first mode to the second mode; and when the watercraft is remote from the target spot by the predetermined distance or more, switching the second mode to the first mode so as to control the marine propulsion device in the first mode.

13. The method according to claim 9, further comprising:

controlling the marine propulsion device in the first mode such that the watercraft is maintained in a position thereof located at a point in time when the operating signal indicating the first mode was received.

14. The method according to claim 9, further comprising:

determining whether or not the watercraft is remote from the target spot by a predetermined distance or more in the first mode; and when the watercraft is remote from the target spot by the predetermined distance or more in the first mode, selecting one of the bow mode or the stern mode in which the marine propulsion device is controlled so as to control the marine propulsion device such that the watercraft is moved from the first spot to the target spot in the selected one of the bow mode or the stern mode.

15. A method of controlling a watercraft including a marine propulsion device and an input, the method comprising:

receiving an operating signal indicating a first mode selected in accordance with an operation of the input;

controlling the marine propulsion device such that the watercraft is maintained in a target spot in the first mode; and when it is intended to move the watercraft to the target spot from a first spot remote from the target spot in the first mode, selecting one of a bow mode or a stern mode in which the marine propulsion device is controlled depending on a position of the target spot with respect to the first spot so as to control the marine propulsion device such that the watercraft is moved from the first spot to the target spot in the bow mode or the stern mode; wherein the bow mode orients a bow of the watercraft so that the bow faces toward the target spot, and the stern mode orients a stern of the watercraft so that the stern faces toward the target spot;

the method further comprises determining whether or not a turning speed of the watercraft is a predetermined speed or less when the marine propulsion device is controlled such that the bow of the watercraft is oriented toward the target spot by selecting the bow mode in the first mode; and when the turning speed of the watercraft is the predetermined speed or less in the bow mode, switching the bow mode to the stern mode so as to control the marine propulsion device in the stern mode.

16. A method of controlling a watercraft including a marine propulsion device and an input, the method comprising:

receiving an operating signal indicating a first mode selected in accordance with an operation of the input;

controlling the marine propulsion device such that the watercraft is maintained in a target spot in the first mode; and when it is intended to move the watercraft to the target spot from a first spot remote from the target spot in the first mode, selecting one of a bow mode or a stern mode in which the marine propulsion device is controlled depending on a position of the target spot with respect to the first spot so as to control the marine propulsion device such that the watercraft is moved from the first spot to the target spot in the bow mode or the stern mode; wherein the bow mode orients a bow of the watercraft so that the bow faces toward the target spot, and the stern mode orients a stern of the watercraft so that the stern faces toward the target spot;

the method further comprises determining whether or not a turning speed of the watercraft is a predetermined speed or less when the marine propulsion device is controlled such that the stern of the watercraft is oriented toward the target spot by selecting the stern mode in the first mode; and when the turning speed of the watercraft is the predetermined speed or less in the stern mode, switching the stern mode to the bow mode so as to control the marine propulsion device in the bow mode.

* * * * *